United States Patent [19]

Hansen

[11] Patent Number: 5,361,074
[45] Date of Patent: Nov. 1, 1994

[54] MAINLOBE CANCELLER SYSTEM

[75] Inventor: James P. Hansen, Waldorf, Md.

[73] Assignee: The United States of America as represented by the Secretary of the Navy, Washington, D.C.

[21] Appl. No.: 153,819

[22] Filed: May 5, 1980

[51] Int. Cl.$^5$ .................. G01S 3/16; G01S 3/28; G01S 5/04; H04B 1/18

[52] U.S. Cl. .................. 342/381; 342/384; 342/432; 455/283

[58] Field of Search .................. 343/100 LE, 100 CL, 343/381, 384, 432; 455/271, 284, 283

[56] References Cited

U.S. PATENT DOCUMENTS

| | | | |
|---|---|---|---|
| 3,860,924 | 1/1975 | Evans | 343/100 LE |
| 3,938,154 | 2/1976 | Lewis | 343/100 LE |
| 3,987,444 | 10/1976 | Masak | 343/100 LE |
| 4,044,359 | 8/1977 | Applebaum et al. | 343/100 LE |
| 4,096,480 | 6/1978 | Miner et al. | 343/100 LE |
| 4,275,397 | 6/1981 | Gutleber | 455/283 |

Primary Examiner—Stephen C. Buczinski
Attorney, Agent, or Firm—Thomas E. McDonnell

[57] ABSTRACT

An interference suppression system for cancelling undesired signals received through the mainlobe of an antenna as well as its sidelobes. The interference suppression system has a main channel input having high gain for receiving desired signals and undesired signals and forming a main channel waveform, and an auxiliary channel input having low gain for receiving desired signals and undesired signals and forming an auxiliary channel waveform. A control circuit senses the relative undesired signal power in the two channels and responds by switching the waveforms in the two channels between two inputs of an interference-reducing circuit according to whether sidelobe or mainlobe interference is present in the main channel. The interference-reducing circuit corrects whichever waveform is fed to its first input in amplitude and phase and combines the corrected waveform with the other waveform at its second input to form an output waveform such that undesired signals in the two input waveforms substantially cancel one another while the desired signal is not cancelled.

6 Claims, 3 Drawing Sheets

MAINLOBE CANCELLER SYSTEM

BACKGROUND OF THE INVENTION

The present invention relates to improvements in signal-processing systems and more particularly to improved techniques for eliminating interference introduced into the mainlobe of an antenna from an interference source.

Signal-processing equipment in general is designed with a goal of receiving only particular information for evaluation. However, as is often the case, desired information is not isolated by itself but may be found in the presence of unwanted signals. Antenna systems in particular have characteristics that include a mainlobe for receiving desired information and a plurality of sidelobes at various angles relative to the mainlobe. Due to the nature of an antenna, information received in a sidelobe is indistinguishable from information received in the mainlobe and thus renders the equipment highly susceptible to interference from unwanted signals or information. This problem is particularly acute in radar systems where the presence of sidelobes makes it possible for a single noise jammer to be effective against a radar from any angle of azimuth.

Sidelobe cancellation is a fundamental approach to eliminating interference in received signals and has been used relatively successfully to eliminate the interference introduced from a single jamming source. Generally, to provide successful cancellation, the sidelobe canceller employs auxiliary omni-directional antennas, receiving channels and adaptive cancellation loops to remove interference signals which enter the sidelobe response of a radar system. The adaptive loops function by adjusting the phase and amplitude of the received auxiliary signals such that they subtract out the interference present in the main radar channel.

Such a system is taught, for example by U.S. Pat. No. 3,938,154 issued to Bernard L. Lewis on Aug. 16, 1964. The gains of the auxiliary channels are nominally made much less than the mainlobe gain of the radar system in order to prevent cancellation of legitimate target-return signals. This relative gain difference prohibits the sidelobe canceller from effectively cancelling direct-path jamming interference received by the radar mainlobe.

Typical performance of a conventional coherent sidelobe cancellation system against a pair of barrage-jamming sources is illustrated by the plan position indicator photos shown in FIGS. 1 and 2. The photo shown in FIG. 1 corresponds to no cancellation, while the photo shown in FIG. 2 was taken with cancellation. Note the presence of the two mainlobe jamming residues which remain in the cancelled case.

Two primary methods have been proposed to remove or reduce this mainlobe jamming residue. The first method depends on utilizing a directional antenna and receiving system with a gain approximately equal to that of the main radar channel but with a directional response which is offset in azimuth from the peak of the mainlobe. This additional system then provides interference signals which are of sufficient magnitude to subtract out mainlobe interference. Some target-return signals common to both systems will also be subtracted out and the net result is a relative narrowing of the mainlobe. The practical problem of providing an additional receiving system equivalent to the main radar system is a drawback of this technique.

The second mainlobe interence technique is simpler a gain control function. The mainlobe jamming residue is used with an adaptive loop to cancel itself (with cancellation being directly proportional to received jamming power). Since all signals are reduced by the same amount in this techniques, the result is largely cosmetic with no improvement in the target signal-to-jamming interference ratio of the main channel.

SUMMARY OF THE INVENTION

Briefly described, the subject invention involves an interference suppression system for cancelling undesired signals received through the mainlobe of an antenna as well as its sidelobes. The interference suppression system has a main channel input for receiving desired signals and undesired signals and forming a main channel waveform, and an auxiliary channel input for receiving desired signals and undesired signals and forming an auxiliary channel waveform. A control circuit senses the relative undesired-signal power in the two channels and responds by switching the waveforms in the two channels between two inputs of an interference-reducing circuit according to whether sidelobe or mainlobe interference is present in the main channel. The interference-reducing circuit corrects whichever waveform is fed to its first input in amplitude and phase and combines the corrected waveform with the other waveform at its second input to form an output waveform such that undesired signals in the two input waveforms substantially cancel one another while the desired signals do not cancel. The interference suppression system utilizes a minimum of equipment and provides both a cosmetic reduction of mainlobe jamming and, in the instances where the target is not aligned in the direction of the jammer, an improvement in the target signal-to-mainlobe jamming interference ratio. Previous mainlobe techniques have either provided just a cosmetic cancellation or have required extensive additional equipment.

Additional advantages and features will become apparent as the subject invention becomes better understood by reference to the following detailed description when taken in conjunction with the accompanying drawings wherein:

DESCRIPTION OF THE PREFERRED EMBODIMENT

Figure 3:
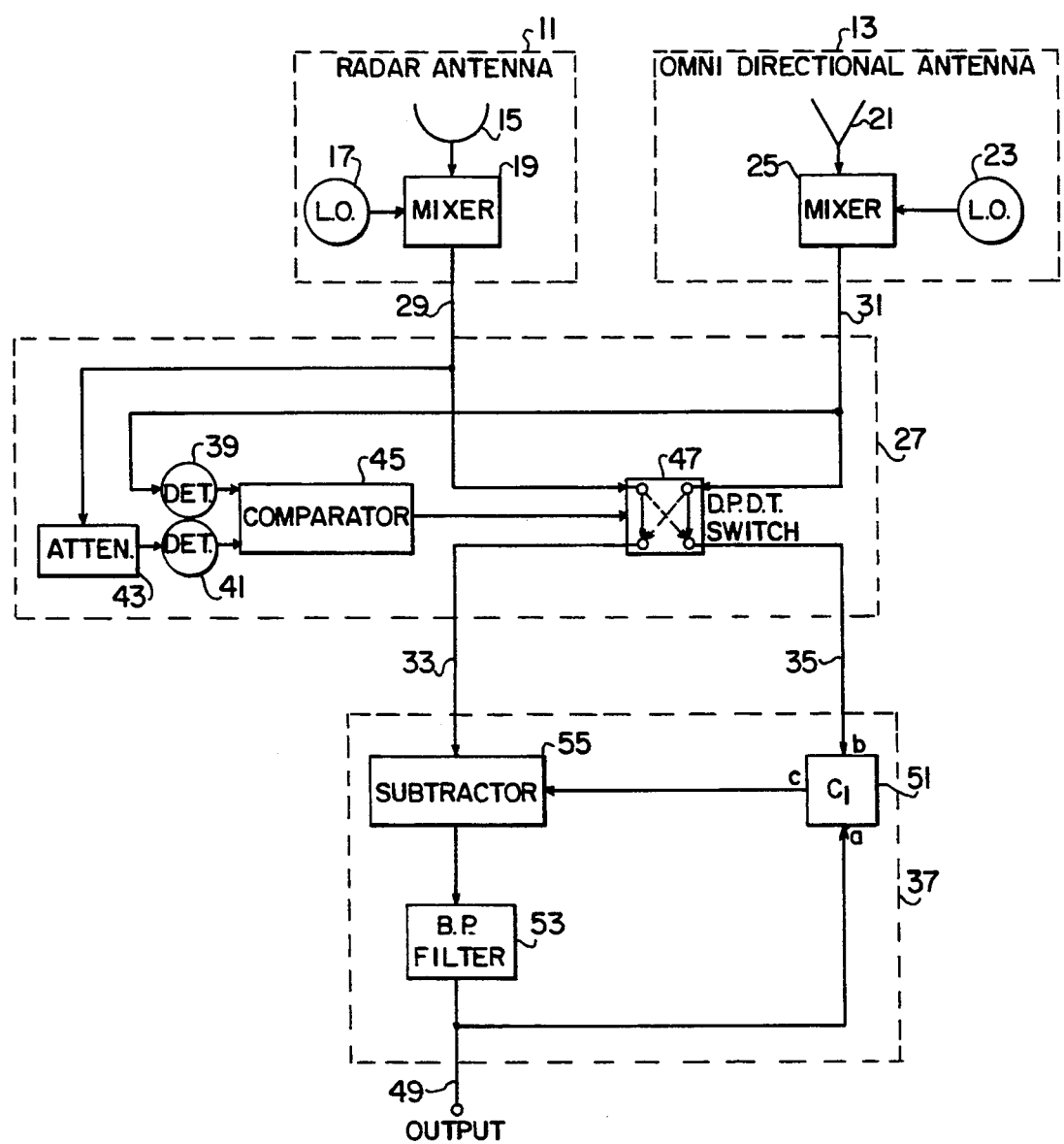
FIG. 3 is a block schematic diagram of a first embodiment of the interference-suppression system of the invention.

Referring now to the drawings wherein like reference characters refer to like or corresponding parts, FIG. 3 illustrates an interference-suppression system which can suppress interference signals received through the mainlobe of an antenna as well as interference signals received through its sidelobe.

The interference-suppression system includes a main channel means 11, having high gain, which receives desired signals and undesired signals and forms a main channel waveform. Also shown is an auxiliary channel means 13, having low gain, which receives desired signals and undesired signals and forms an auxiliary channel waveform. While a variety of main channel means 11 may be provided, such means may conveniently take the form illustrated in the Figure of a directional radar antenna 15, a local oscillator 17, and a mixer 19 receiving input signals from antenna 15 and oscillator 17. Similarly, while a variety of auxiliary channels means 13 may be provided, the latter may conveniently take the form illustrated of an omnidirectional antenna 21, a local oscillator 23, and a mixer 25 receiving input signals from antenna 21 and oscillator 23. Directional antenna 15 receives from its mainlobe a desired radar signal, and from either its mainlobe or its sidelobes, any undesired interference that ray be present. Omnidirectional antenna 21 receives both a desired radar signal and an undesired interference signal which are identical to the signals received by antenna 15 except for gain differences introduced by the antenna responses and phase shifts introduced by the difference in path lengths of the two antennas from the radar signal source and from the interference source. The gains of the two channel means 11 and 13 are such that in the case of interference picked up by the sidelobe of the directional antenna 15, the interference signal received by the omnidirectional antenna 21 is larger than that received by the directional antenna 15; in the case of interference picked up by the mainlobe of the directional antenna, however, the interference signal received by omnidirectional 21 is less than that received by directional antenna 15. Also, in the case of a desired radar signal picked up by the mainlobe of directional antenna 15, the desired radar signal picked up by omnidirectional antenna 21 is always much less than that picked up by the directional antenna. The output from directional antenna 15 is mixed. in the mixer 19 with the output of the local oscillator 17 down to an intermediate frequency (IF). The output of the omnidirectional antenna 21 is mixed in the second mixer 25 down to an intermediate frequency offset from the frequency of the main channel means 11 by an amount at least equal to the main channel signal bandwidth.

Referring again to FIG. 3, a control means 27 is disposed between the respective outputs 29 and 31 of the main and auxiliary channel means 11 and 13 and the inputs 33 and 35 of an interference-reducing means 37. As will be explained subsequently, control means 27 is responsive to the relative undesired-signal power at the outputs of the main channel means 11 and the auxiliary channel means 13 for providing a selectively closable electrical conduction path between the main channel means 11 and either of the two inputs 33 and 35 of the interference-reducing means and for providing a selectively closable electrical conduction path between the auxiliary channel means 13 and the other of the two inputs 33 and 35 of the interference reducing means. While the control means 27 may take a variety of forms, conveniently it may take the form illustrated in the Figure of a first detector 39 connected to output 31 of the auxiliary channel means 13, a second detector 41 connected through an attenuator 43 to output 29 of the main channel means 11, a comparator 45 having a pair of inputs respectively connected to the outputs of detectors 39 and 41, and a double-pole, double-throw electronic switch 47 having a control input connected to the output of the comparator 45, a first pair of contacts respectively connected to the outputs 29 and 31 of the two channel means and a second pair of contacts respectively connected to the inputs 33 and 35 of the interference-reducing means 37. Detector 39 which may comprise, for example, a balanced mixer and a low pass filter, detects the average power of high-duty-cycle undesired interference received by the auxiliary channel means 13. The filter response of the detector is adjusted so that it does not respond to a relatively low-duty-cycle desired radar signal. Detector 41 detects the attenuated (by attenuator 43) average power of the undesired interference received by the main channel means 11. According to whether interference is picked up by the sidelobes or by the mainlobe of the directional antenna 15, the difference in amplitude of the two analog signals produced by detectors 39 and 41 will be positive or negative. Comparator 45 provides a logic output (e.g., "1" or "0") to the control input of the switch 47 indicating the polarity of the amplitude difference.

The level at which the output of the comparator 45 changes state is set by the attenuator 43. The double-pole, double-throw switch 47, which may comprise, for example, an Amphenol model 2P2T remote coaxial switch, responds to the output of the comparator as follows. When interference is picked up by the sidelobes of the directional antenna 15, switch 47 assumes a first position shown in solid lines wherein the output 29 of the main channel means 11 is connected to the first input 33 of the interference-reducing means 37, and the output 31 of the auxiliary channel means 13 is connected to the second input 35 of the interference-reducing means. Alternatively, when interference is picked up by the mainlobe of the directional antenna 13, switch 47 assumes a second position shown in dotted lines wherein the output 29 of the main channel means 11 is connected to the second input 35 of the interference-reducing means 37 and the output 31 of the auxiliary channel means 13 is connected to the first input 33 of the interference-reducing means.

Interference-reducing means 37 corrects the waveform received at its second input 35 in amplitude and phase and combines the corrected waveform with the waveform received at its first input 33 to form an output 49 such that the undesired interference signals in the two waveforms substantially cancel one another while the desired radar signal is not cancelled. While a variety of interference-reducing means 37 may be provided, such means may conveniently take the form illustrated of a canceller 51 having one input (b) connected to the second input 35 of the interference-reducing means 37, another input (a) connected through a bandpass filter 53 and a subtractor 55 to the first input 33 of the interference-reducing means, and an output (c) fed back to the subtractor. The construction and operation of such an interference-reducing means is well known and taught by U.S. Pat. No. 3,938,154 issued to Bernard L. Lewis on Aug. 16, 1964, the disclosure of which is hereby incorporated by reference, and will therefore not be discussed in greater detail.

In operation, when interference is picked up by the sidelobes of directional antenna 15, switch 47 adopts the first position indicated by solid lines, and the main channel waveform is fed to the first input 33 of the interference-reducing means 37 while the auxiliary channel waveform is fed to the second input 35 of the interference-reducing means. The interference signal in the waveform from the directional antenna is cancelled by subtracting from the latter in subtractor 55 the waveform of the omnidirectional antenna appropriately changed in amplitude and shifted in frequency by canceller 51. The bandpass filter 53 closes the loop and provides at output 49 the remainder which is the desired radar signal.

On the other hand, when interference is picked up by the mainlobe of directional antenna 15, switch 47 adopts the second position indicated by dotted lines and the main channel waveform is fed to the second input 35 of the interference-reducing means while the auxiliary channel waveform is fed to the first input 33 of the interference-reducing means. The interference signal in the waveform from the omni-directional antenna is cancelled by subtracting from the latter in the subtractor 55 the waveform of the directional antenna appropriately changed in amplitude and shifted in frequency by canceller 51. The bandpass filter 53 closes the loop and provides the remainder which is an attenuated replica of the desired radar signal.

Figure 1:
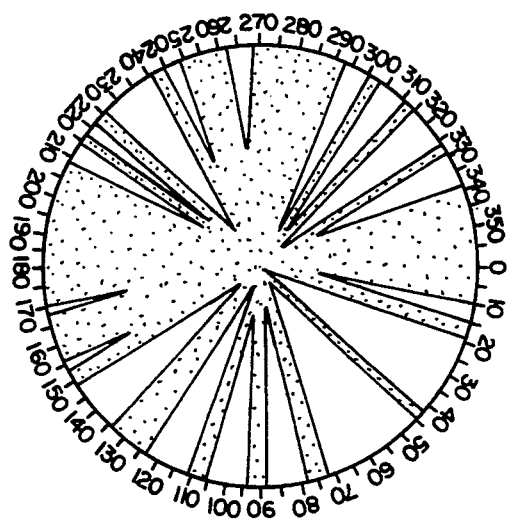
FIG. 1 is a plan position indicator photograph taken in a prior-art radar without cancellation.
Figure 2:
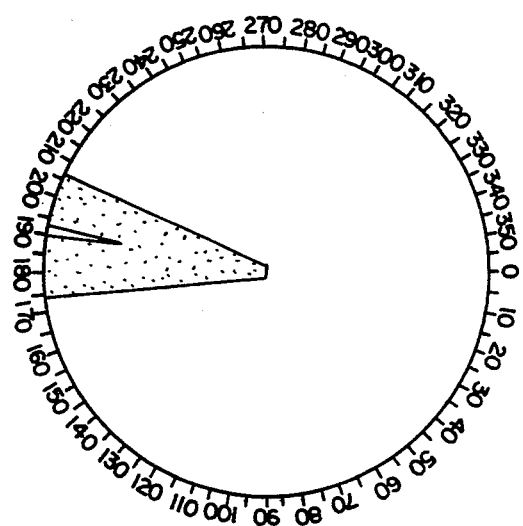
FIG. 2 is a plan position indicator photograph taken in a prior-art radar with sidelobe cancellation.
Figure 4:
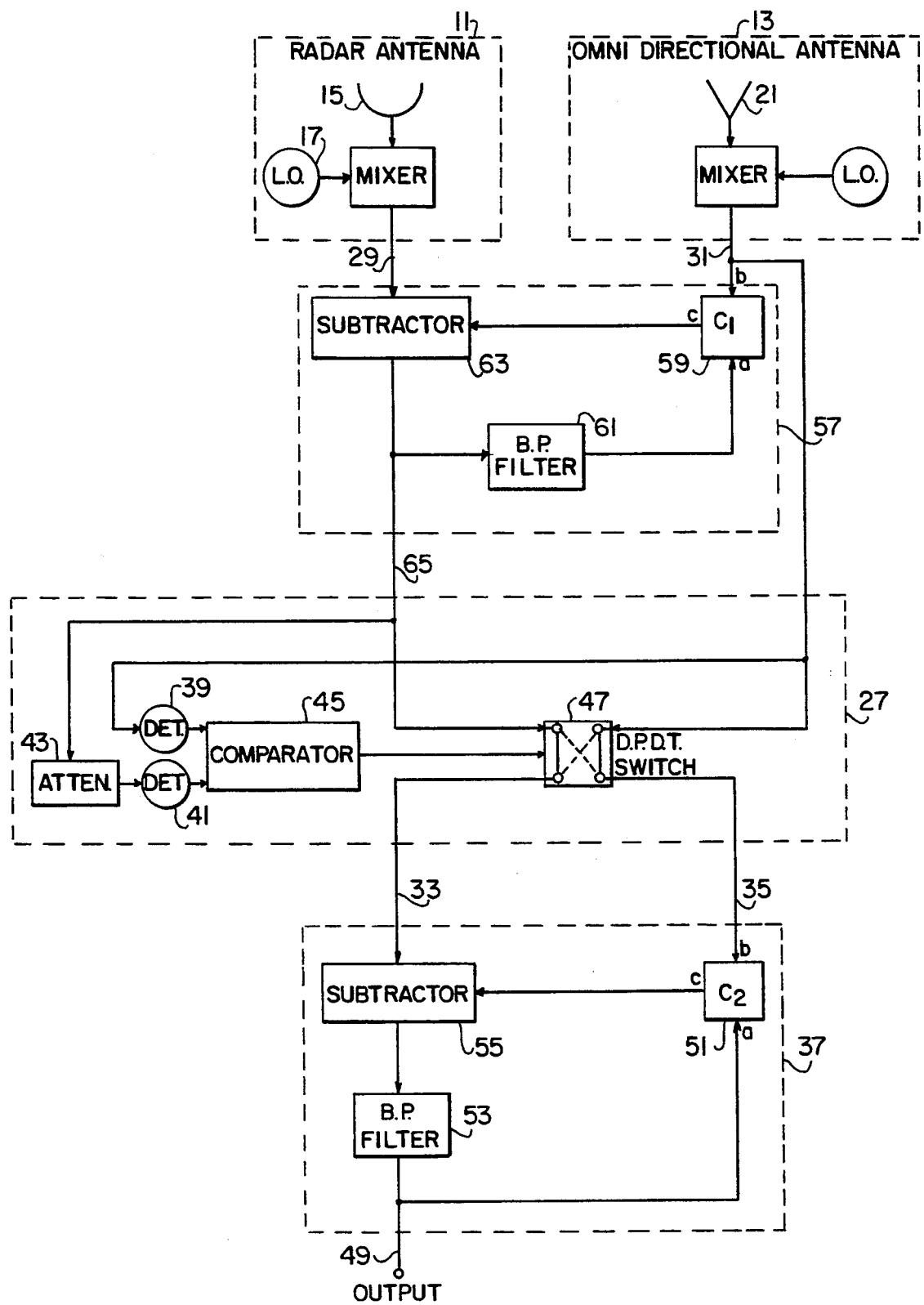
FIG. 4 is a block schematic diagram of a second embodiment of the interference-suppression system of the invention.

FIG. 4 illustrates a modification of the system shown and described in FIG. 3. The principal difference in the system of FIG. 4 from that of FIG. 3 lies in the addition of another interference-reducing means 57 between the output 29 of the main channel means 11 and the input of control means 27 to which the latter was formerly connected. While a variety of interference-reducing means 57 may be provided, such means may conveniently take the form illustrated of a canceller 59 having one input (b) connected to the output 31 of the auxiliary channel means 13, another input (a) connected through a bandpass filter 61 and a subtractor 63 to the output 29 of the main channel means, and an output (c) fed back to the subtractor 63. The second interference-reducing means described is identical to means 37 in construction and operation except that the output 65 thereof is taken from the subtractor 63. Additionally, control means 27 is modified by connecting attenuator 43 to output 65. The operation of the modified system of FIG. 2 is similar to that of the system of FIG. 1 except that interference-reducing means 37 operates on any residue of interference remaining after cancellation at the output of the added interference-reducing means 57.

While the invention has been described with particular reference to a radar system, the teachings are equally applicable to any other signal-processing systems such as sonar, etc. In addition, while the above description refers to only one auxiliary channel means it is obvious that the same principles can be applied for any number of auxiliary channel means, Obviously, many modifications and variations of the present invention are possible in light of the above teachings. It is therefore to be understood that within the scope of the appended claims the invention may be practiced otherwise than as described.

What is claimed and desired to be secured by Letters Patent of the United States is:

1. An interference-suppression system for cancelling undesired signals received through the mainlobe of an antenna as well as its sidelobes comprising:

main channel means having high gain for receiving desired signals and undesired signals and forming a main channel waveform;

auxiliary channel means having low gain for receiving desired signals and undersized signals and forming an auxiliary channel waveform;

interference-reducing means, having first and second inputs to receive respective input waveforms, for correcting the waveform at the first input in amplitude and phase and combining the corrected waveform with the waveform at the second input to form an output waveform such that undesired signals in the two input waveforms substantially cancel one another while a desired signal is not cancelled; and control means responsive to the relative undesired signal power at the outputs of the main channel means and the auxiliary channel means for providing a selectively closable electrical conduction path between the main channel means and either of the first and second inputs of the interference-reducing means and for providing a selectively closable electrical conduction path between the auxiliary channel means and the other of the first and second inputs of the interference reducing means.

2. The interference-suppression system recited in claim 1 wherein the control means includes:

a first detector connected to the output of the auxiliary channel means for detecting the average power of the undesired signals received by the auxiliary channel means;

an attenuator connected to the output of the main channel means afor attenuating the average power of the undesired signals received by the main channel means;

a second detector connected to the attenuator for detecting the attenuated average power of the undesired signals received by the main channel means;

a comparator connected to the first and second detectors for comparing the average power of the undesired signals received by the auxiliary channel means and the attenuated average power of the undesired signals received by the main channel means and providing an output corresponding to the difference therebetween; and a switch connected to the comparator and responsive to the output thereof for providing a selectively closable electrical conduction path between the main channel means and either of the first and second inputs of the interference-reducing means and for providing a selectively closable electrical conduction path between the auxiliary channel means and the other of the first and second inputs of the interference-reducing means.

3. The interference-suppression system recited in claim 1 wherein:

the main channel means includes a directional antenna for providing the main channel waveform; and the auxiliary channel means includes an omnidirectional antenna for providing the auxiliary channel waveform.

4. An interference-suppression system for cancelling undesired signals received through the mainlobe of an antenna as well as its sidelobes comprising:

main channel means having high gain for receiving desired signals and undesired signals and forming a main channel waveform;

auxiliary channel means having low gain for receiving primarily undesired signals and forming an auxiliary channel waveform;

first interference-reducing means having a pair of inputs respectively connected to the main channel means and the auxiliary channel means for correcting the auxiliary channel waveform in amplitude and phase and combining the corrected auxiliary channel waveform with the main channel waveform to form an output waveform such that undesired signals in the main channel waveform and the auxiliary channel waveform substantially cancel one other while a desired signal is not cancelled;

second interference-reducing means having first and second inputs to receive respective input waveforms for correcting the waveform at the first input in amplitude and phase and combining the canceled waveform with the waveform at the second input to form an output waveform such that the undesired signals in the two input waveforms substantially cancel one another while the desired signal is not cancelled; and control means responsive to the relative undesired-signal power in the main channel means and the auxiliary channel means for providing a selectively closable conduction path between the first interference-reducing means and either of the first and second inputs of the second interference-reducing means, and for providing a selectively closable conduction path between the auxiliary channel means and the other of the first and second inputs of the second canceller means.

5. The interference-suppression system recited in claim 4 wherein the control means includes:

a first detector connected to the output of the auxiliary channel means for detecting the average power of the undesired signals received by the auxiliary channel means;

an attenuator connected to the output of the first interference reducing means for attenuating the average power of the undesired signals at the output of the first interference-reducing means;

a second detector connected to the attenuator for detecting the attenuated average power of the undesired signals at the output of the first interference-reducing means;

a comparator connected to the first and second detectors for comparing the average power of the undesired signals received by the auxiliary channel means and the attenuated average power of the undesired signals at the output of the first interference-reducing means; and a switch connected to the comparator and responsive to the output thereof for providing a selectively closable electrical conduction path between the first interference-reducing means and either of the first and second inputs of the second interference reducing means and for providing a selectively closable electrical conduction path between the auxiliary channel means and the other of the first and second inputs of the second interference-reducing means.

6. The interference-suppression system recited in claim 4 wherein:

the main channel means includes a directional antenna for providing the main channel waveform; and the auxiliary channel means includes an omnidirectional antenna for providing the auxiliary channel waveform.

* * * * *